United States Patent
Bailey et al.

(10) Patent No.: US 10,690,057 B2
(45) Date of Patent: Jun. 23, 2020

(54) TURBOMACHINE COMBUSTOR END COVER ASSEMBLY WITH FLAME DETECTOR SIGHT TUBE COLLINEAR WITH A TUBE OF A BUNDLED TUBE FUEL NOZZLE

(71) Applicant: General Electric Company, Schenectady, NY (US)

(72) Inventors: Donald Mark Bailey, Simpsonville, SC (US); Mark William Pinson, Greer, SC (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 263 days.

(21) Appl. No.: 15/496,021

(22) Filed: Apr. 25, 2017

(65) Prior Publication Data

US 2018/0306118 A1    Oct. 25, 2018

(51) Int. Cl.
| | |
|---|---|
| *F23D 14/62* | (2006.01) |
| *F02C 7/22* | (2006.01) |
| *F02C 3/04* | (2006.01) |
| *F23R 3/00* | (2006.01) |
| *F23R 3/46* | (2006.01) |
| *F23D 14/02* | (2006.01) |
| *F23N 5/08* | (2006.01) |

(52) U.S. Cl.
CPC ............... *F02C 7/222* (2013.01); *F02C 3/04* (2013.01); *F23D 14/02* (2013.01); *F23D 14/62* (2013.01); *F23N 5/082* (2013.01); *F23R 3/002* (2013.01); *F23R 3/46* (2013.01); *F05D 2220/32* (2013.01); *F05D 2240/35* (2013.01); *F23N 2229/00* (2020.01); *F23N 2900/05005* (2013.01)

(58) Field of Classification Search
CPC ....... F23N 2029/00; F23N 2900/05005; F01D 17/02; F23M 11/04; F23M 11/042; F23M 11/045; F05D 2270/804; F05D 2270/8041
See application file for complete search history.

(56) References Cited

U.S. PATENT DOCUMENTS

| | | | | |
|---|---|---|---|---|
| 3,902,841 A | * | 9/1975 | Hom ................ | F23N 5/082 |
| | | | | 431/79 |
| 4,753,593 A | * | 6/1988 | Mutchler ............ | F23D 11/406 |
| | | | | 431/183 |
| 5,857,320 A | * | 1/1999 | Amos ................ | F01D 21/00 |
| | | | | 60/39.091 |

(Continued)

FOREIGN PATENT DOCUMENTS

| | | |
|---|---|---|
| EP | 2 221 542 A2 | 8/2010 |
| EP | 1956292 B1 | 4/2013 |

(Continued)

*Primary Examiner* — Jason H Duger
*Assistant Examiner* — Todd N Jordan
(74) *Attorney, Agent, or Firm* — Dority & Manning, P.A.

(57) ABSTRACT

The present disclosure is directed to an end cover assembly for a combustor of a turbomachine. The end cover assembly includes an end cover and a bundled tube fuel nozzle assembly positioned downstream from the end cover. The bundled tube fuel nozzle assembly includes a plurality of fuel nozzle tubes. A flame detector sight tube couples to the end cover. The flame detector sight tube is aligned with one of the fuel nozzle tubes.

16 Claims, 3 Drawing Sheets

(56) References Cited

U.S. PATENT DOCUMENTS

| | | | |
|---|---|---|---|
| 6,036,476 A * | 3/2000 | Mitani | F23C 3/002 431/215 |
| 6,806,471 B2 * | 10/2004 | Matsukuma | G08B 17/12 250/339.05 |
| 7,128,991 B2 | 10/2006 | Ozeki et al. | |
| 7,305,118 B2 * | 12/2007 | Leboeuf | F01D 21/003 382/152 |
| 7,682,574 B2 * | 3/2010 | Chiu | F23G 5/50 422/108 |
| 7,871,303 B2 | 1/2011 | Cole | |
| 7,886,734 B2 | 2/2011 | Jin | |
| 7,893,615 B2 | 2/2011 | Cole | |
| 7,956,329 B2 | 6/2011 | Laluvein et al. | |
| 8,123,517 B2 | 2/2012 | Peruch | |
| 8,201,973 B2 | 6/2012 | Kudoh et al. | |
| 8,274,560 B2 | 9/2012 | Galfrascoli et al. | |
| 8,283,646 B2 | 10/2012 | Murphy et al. | |
| 8,346,500 B2 | 1/2013 | Lee et al. | |
| 8,485,271 B2 | 7/2013 | Archibald et al. | |
| 8,490,710 B2 | 7/2013 | Archibald et al. | |
| 8,521,400 B2 | 8/2013 | Yamashita et al. | |
| 8,616,002 B2 * | 12/2013 | Kraemer | F23N 5/082 60/39.463 |
| 8,703,340 B2 | 4/2014 | Kim et al. | |
| 8,715,371 B2 | 5/2014 | Behrendt et al. | |
| 8,899,049 B2 * | 12/2014 | Krull | F23N 5/082 356/432 |
| 8,993,966 B2 | 3/2015 | Cole | |
| 9,068,747 B2 | 6/2015 | Huang | |
| 9,134,181 B2 | 9/2015 | Slemon et al. | |
| 9,170,020 B2 | 10/2015 | Diebold et al. | |
| 9,335,046 B2 | 5/2016 | Kraemer | |
| 9,388,984 B2 | 7/2016 | Anderson | |
| 9,435,690 B2 * | 9/2016 | Hoffman | F23M 11/045 |
| 9,449,485 B2 | 9/2016 | Lapp | |
| 9,459,142 B1 | 10/2016 | Huseynov et al. | |
| 9,466,195 B1 | 10/2016 | Boyer et al. | |
| 2008/0273995 A1 | 11/2008 | Bailey et al. | |
| 2010/0205970 A1 | 8/2010 | Hessler et al. | |
| 2011/0008737 A1 * | 1/2011 | McManus | F23N 1/022 431/12 |
| 2011/0232296 A1 | 9/2011 | Frederick | |
| 2012/0048971 A1 * | 3/2012 | Kaleeswaran | F23R 3/28 239/602 |
| 2012/0227929 A1 | 9/2012 | Rose et al. | |
| 2012/0247443 A1 | 10/2012 | Atalay et al. | |
| 2012/0298867 A1 | 11/2012 | Nishikawa et al. | |
| 2013/0040254 A1 * | 2/2013 | Krull | F23N 5/02 431/253 |
| 2013/0234028 A1 | 9/2013 | Larsen et al. | |
| 2013/0247576 A1 * | 9/2013 | Myhre | F23N 5/08 60/772 |
| 2013/0318942 A1 * | 12/2013 | Kraemer | F23R 3/46 60/39.091 |
| 2015/0010872 A1 | 1/2015 | Schindler et al. | |
| 2015/0204725 A1 | 7/2015 | Huseynov et al. | |
| 2015/0379845 A1 | 12/2015 | Fischer et al. | |
| 2016/0231145 A1 | 8/2016 | Rogers et al. | |
| 2016/0307423 A1 | 10/2016 | Ebner et al. | |
| 2017/0023402 A1 | 1/2017 | Follett | |

FOREIGN PATENT DOCUMENTS

| | | |
|---|---|---|
| EP | 2578947 A1 | 4/2013 |
| EP | 2682674 A2 | 1/2014 |
| WO | WO 2014/020361 A1 | 2/2014 |
| WO | WO 2016/050334 A1 | 4/2016 |
| WO | WO 2016/6079584 A2 | 5/2016 |
| WO | WO 2016/6079584 A3 | 5/2016 |
| WO | WO 2016/111886 A1 | 7/2016 |

* cited by examiner

TURBOMACHINE COMBUSTOR END COVER ASSEMBLY WITH FLAME DETECTOR SIGHT TUBE COLLINEAR WITH A TUBE OF A BUNDLED TUBE FUEL NOZZLE

FIELD

The present disclosure generally relates to turbomachines. More particularly, the present disclosure relates end cover assemblies for combustors of turbomachines.

BACKGROUND

A gas turbine engine generally includes a compressor section, one or more combustors, and a turbine section. The compressor section progressively increases the pressure of air entering the gas turbine engine and supplies this compressed air to the one or more combustors. The compressed air and a fuel (e.g., natural gas) mix within the combustors and burn within combustion chambers to generate high pressure and high temperature combustion gases. The combustion gases flow from the combustors into the turbine section where they expand to produce work. For example, expansion of the combustion gases within the turbine section may rotate a rotor shaft connected to a generator to produce electricity.

One or more flame detectors may be used to determine the presence of a flame (i.e., combustion of the compressed air and fuel mixture) within the combustion chambers. Typically, the flame detectors are positioned on a compressor discharge casing or a combustor casing. This positioning arrangement, however, provides the flame detectors with a limited view of the combustion chamber.

BRIEF DESCRIPTION

Aspects and advantages of the technology will be set forth in part in the following description, or may be obvious from the description, or may be learned through practice of the technology.

In one embodiment, the present disclosure is directed to an end cover assembly for a combustor of a turbomachine. The end cover assembly includes an end cover and a bundled tube fuel nozzle assembly positioned downstream from the end cover. The bundled tube fuel nozzle assembly includes a plurality of fuel nozzle tubes. A flame detector sight tube couples to the end cover. The flame detector sight tube is aligned with one of the fuel nozzle tubes.

In another embodiment, the present disclosure is directed to a turbomachine. The turbomachine includes a compressor section, a turbine section, and one or more combustors. Each combustor includes an end cover assembly having an end cover and a bundled tube fuel nozzle assembly positioned downstream from the end cover. The bundled tube fuel nozzle assembly includes a plurality of fuel nozzle tubes. A flame detector sight tube couples to the end cover. The flame detector sight tube is aligned with one of the fuel nozzle tubes.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
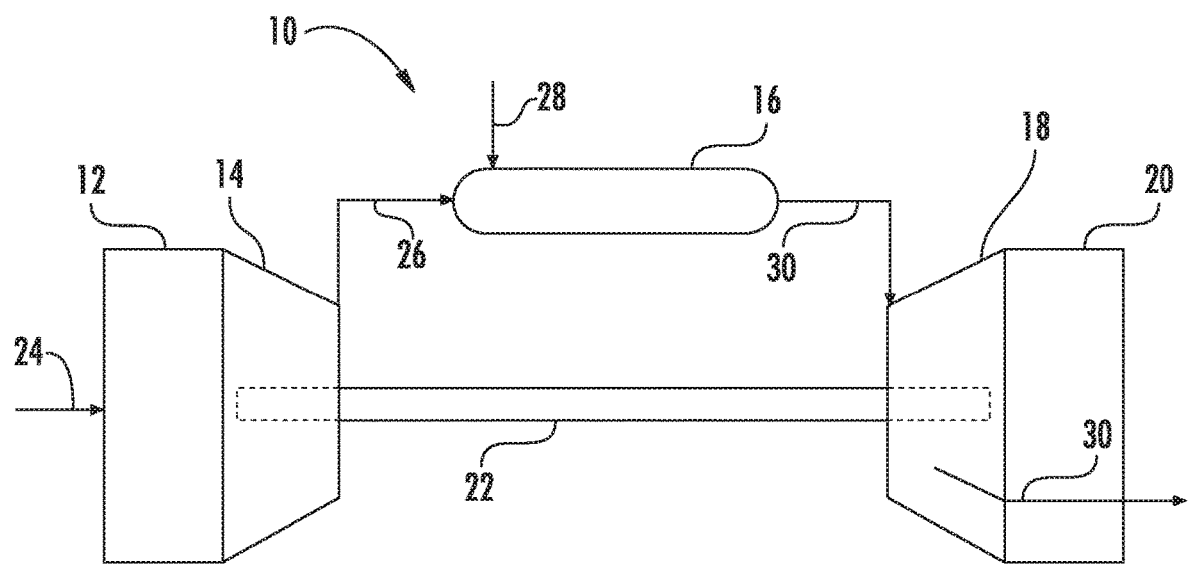
FIG. 1 is a functional block diagram of an exemplary gas turbine engine in accordance with embodiments of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine is shown and described herein, the present technology as shown and described herein is not limited to a land-based and/or industrial gas turbine unless otherwise specified in the claims. For example, the technology as described herein may be used in any type of turbomachine including, but not limited to, aviation gas turbines (e.g., turbofans, etc.), steam turbines, and marine gas turbines.

Now referring to the drawings, wherein identical numerals indicate the same elements throughout the figures, FIG. 1 schematically illustrates an exemplary gas turbine engine 10. As depicted therein, the gas turbine engine 10 includes an inlet section 12, a compressor section 14, one or more combustors 16, a turbine section 18, and an exhaust section 20. The compressor section 14 and turbine section 18 may be coupled by a shaft 22. The shaft 22 may be a single shaft or formed from a plurality of shaft segments coupled together.

During operation, the gas turbine engine 10 produces mechanical rotational energy, which may be used to generate electricity. More specifically, air 24 enters the gas turbine engine 10 via the inlet section 12. From the inlet section 12, the air 24 flows into the compressor section 14, where it is progressively compressed to provide compressed air 26 to each of the combustors 16. The compressed air 26 mixes with a fuel 28 in each of the combustors 16. This compressed air and fuel mixture then burns in each of the combustors 16, thereby producing combustion gases 30. The combustion gases 30 flow through the turbine section 18, which extracts kinetic and/or thermal energy therefrom. This energy extraction rotates the shaft 22, thereby creating mechanical rotational energy for powering the compressor section 14 and/or generating electricity. The combustion gases 30 exit the gas turbine engine 10 via the exhaust section 20.

Figure 2:
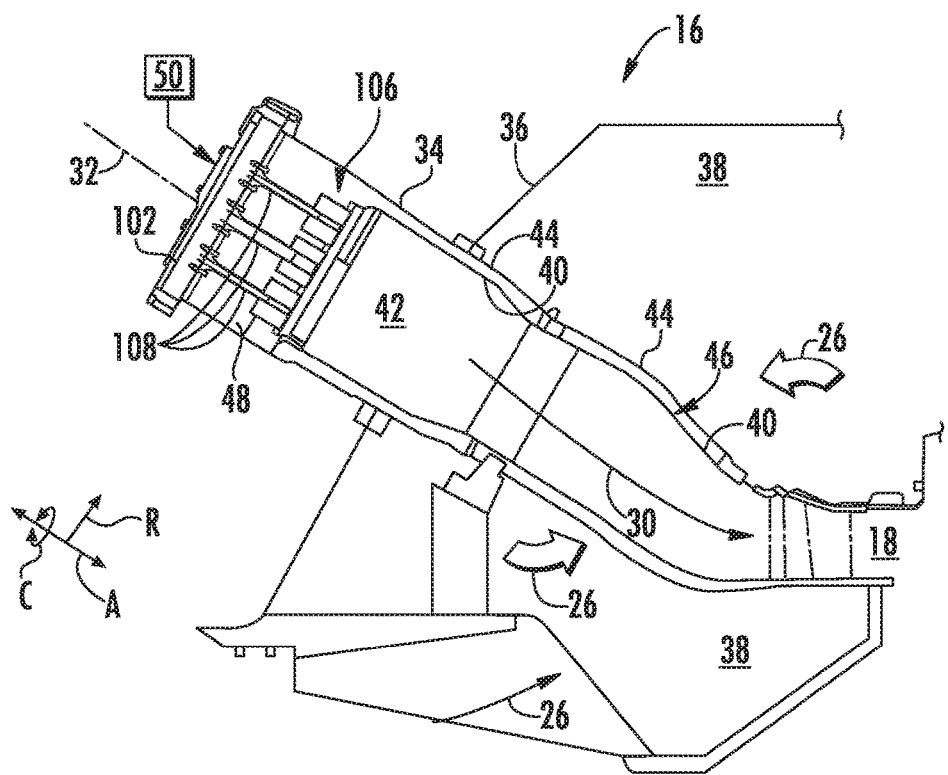
FIG. 2 is a cross-sectional side view of an exemplary combustor in accordance with embodiments of the present disclosure.

FIG. 2 illustrates an exemplary embodiment of one of the combustors 16. As shown, the combustor 16 defines an axial direction A, a radial direction R, and a circumferential direction C. In general, the axial direction A extends parallel to an axial centerline 32 of the combustor 16, the radial direction R extends orthogonally outward from the axial centerline 32, and the circumferential direction C extends concentrically around the axial centerline 32.

As shown in FIG. 2, the combustor 16 is at least partially formed by a combustor casing 34 that couples to a compressor discharge casing 36. In this respect, the combustor casing 34 and the compressor discharge casing 36 collectively define at least a portion of a high pressure plenum 38 in fluid communication with the compressor section 14 (FIG. 1). As such, the combustor casing 34 and the compressor discharge casing 36 contain the compressed air 26 entering the combustor 16 from the compressor section 14.

The combustor 16 also includes a liner 40. In particular, the liner 40 may at least partially define a combustion chamber 42 where the compressed air and fuel mixture combusts. Furthermore, the liner 40 may also at least partially define a hot gas path through the combustor 16 for directing the combustion gases 30 toward an inlet of the turbine section 18. The liner 40 may be a single component or formed from multiple liner segments.

The combustor 16 may further include a flow sleeve 44 that at least partially surrounds the liner 40. In this respect, the flow sleeve 44 is radially spaced from the liner 40, thereby defining an annular flow passage 46 therebetween. As such, the flow sleeve 44 may define a plurality of inlets or apertures that fluidly couple the annular flow passage 46 and the high pressure plenum 38. The flow sleeve 44 may be a single component or formed from multiple flow sleeve segments.

Figure 3:
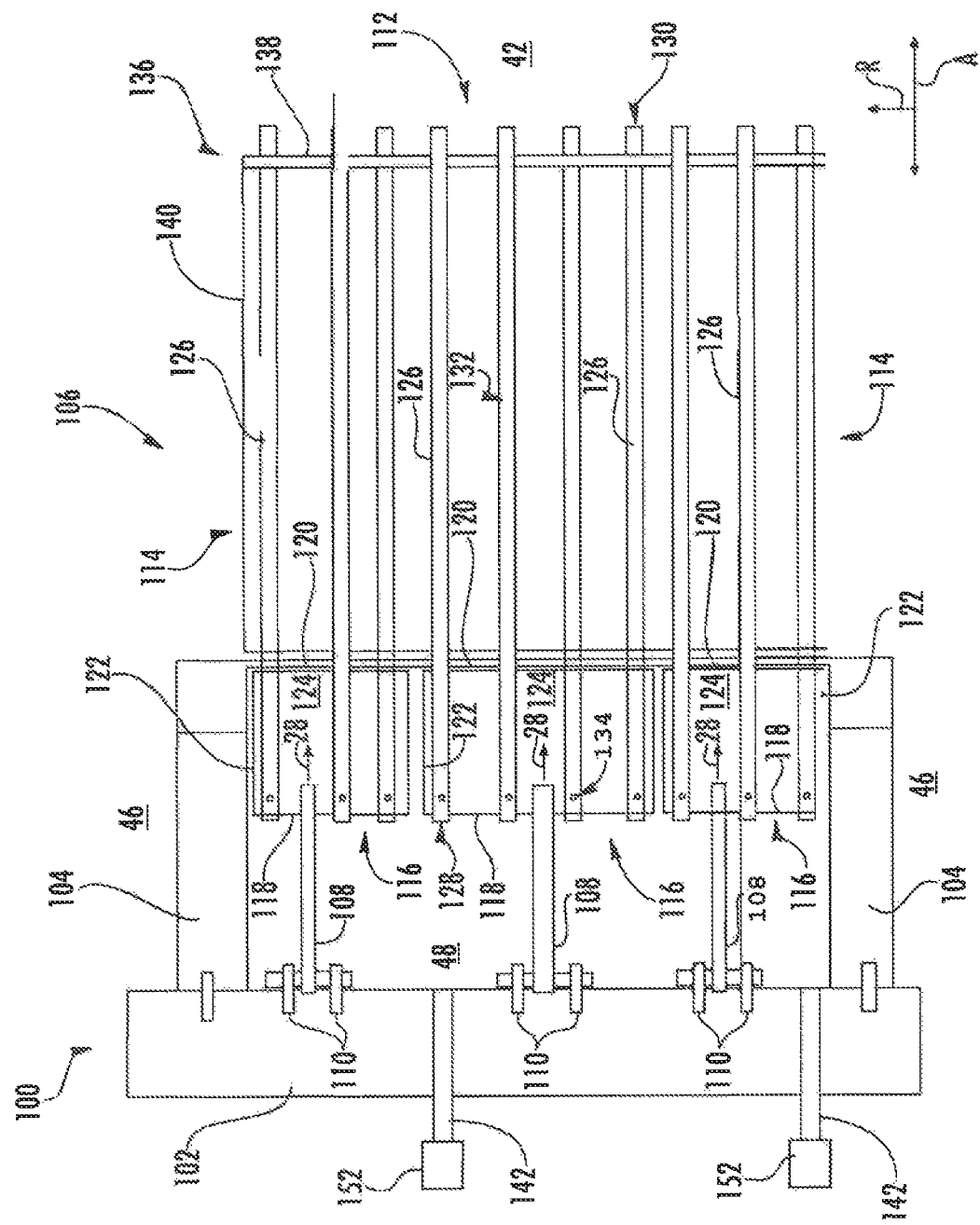
FIG. 3 is a cross-sectional side view of an end cover assembly in accordance with embodiments of the present disclosure.
Figure 4:
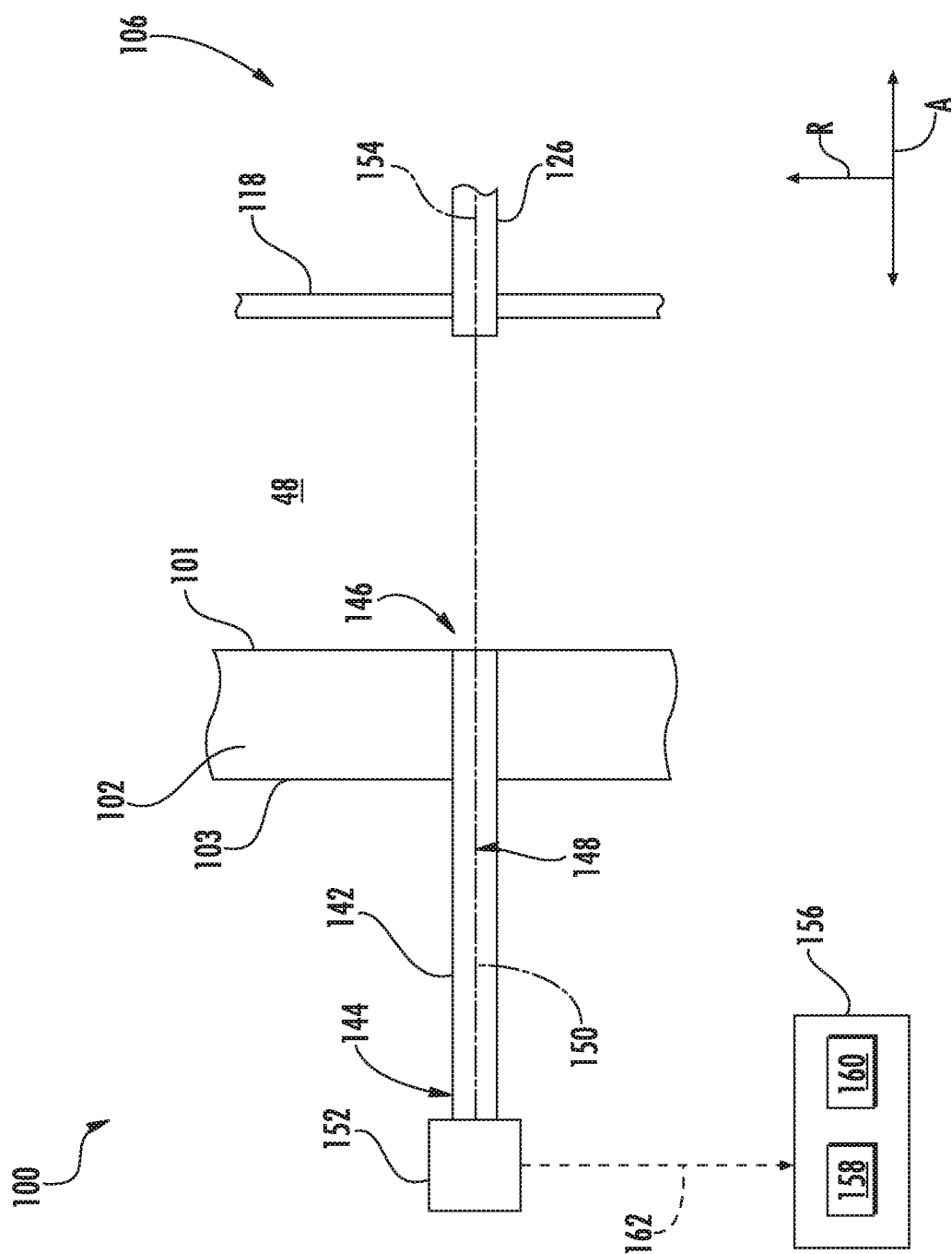
FIG. 4 is an enlarged cross-sectional side view of a portion of the end cover assembly shown in FIG. 3, illustrating the alignment between a fuel nozzle tube and a flame detector sight tube.

Referring now to FIGS. 2 and 3, the combustor 16 includes an end cover assembly 100. More specifically, the end cover assembly 100 includes an end cover 102 coupled to the combustor casing 34. In this respect, the combustor casing 34 and the end cover 102 collectively define a head end volume 48 of the combustor 16. As shown, the head end volume 48 is positioned upstream from the combustion chamber 42. As shown in FIG. 4, the end cover 102 includes a hot side surface 101 positioned proximate to the head end volume 48 and a cold side surface 103 spaced apart from the hot side surface 101 and the head end volume 48.

In some embodiments, the end cover assembly 100 includes an inlet flow conditioner 104 coupled to and positioned downstream from the end cover 102. As shown in FIG. 3, the inlet flow conditioner 104 fluidly couples the annular flow passage 46 and the head end volume 48. In this respect, the inlet flow conditioner 104 conditions the compressed air 26 flowing through the annular flow passage 46 and directs the compressed air 26 into the head end volume 48.

The end cover assembly 100 further includes a bundled tube fuel nozzle assembly 106 positioned downstream from the end cover 102. As shown in FIG. 2, the bundled tube fuel nozzle assembly 106 is positioned within the head end volume 48. In this respect the bundled tube fuel nozzle assembly 106 is positioned axially between the end cover 102 and the combustion chamber 42. The bundled tube fuel nozzle assembly 106 may be coupled to the end cover 102 by one or more fuel conduits 108 and/or various suitable fasteners 110 (e.g., pins, bolts, etc.). Furthermore, the fuel conduits 108 fluidly couple the bundled tube fuel nozzle assembly 106 to a fuel supply 50.

Referring now to FIG. 3, the bundled tube fuel nozzle assembly 106 may include a center fuel nozzle 112 and one or more outer fuel nozzle segments 114 positioned annularly around the center fuel nozzle 112. In the embodiment shown, the bundled tube fuel nozzle assembly 106 includes two outer fuel nozzle segments 114. Although, the bundled tube fuel nozzle assembly 106 may include more or fewer outer fuel nozzle segments 114 in other embodiments. In fact, some embodiments of the bundled tube fuel nozzle assembly 106 may not include any outer fuel nozzle segments 114. In such embodiments, the bundled tube fuel nozzle assembly 106 includes only the center fuel nozzle 112.

Each of the center fuel nozzle 112 and the outer fuel nozzle segments 114 includes a fuel plenum body 116. In particular, each fuel plenum body 116 includes a forward plate 118, an aft plate 120, and an outer band 122. The aft plate 120 is axially spaced apart and positioned downstream from the forward plate 118. The outer band 122 extends axially between the forward plate 118 and the aft plate 120. In this respect, the forward plate 118, the aft plate 120, and the outer band 122 collectively form the fuel plenum body 116, which defines a fuel plenum 124 therein. One of the fluid conduits 108 extends through each forward plate 118 to provide the fuel 28 to the corresponding fuel plenum 124.

Each of the center fuel nozzle 112 and the outer fuel nozzle segments 114 also includes a plurality of fuel nozzle tubes 126. As shown in FIG. 3, the fuel nozzle tubes 126 extend through the forward plate 118, the fuel plenum 124, and the aft plate 120. Each fuel nozzle tube 126 defines an inlet 128, an outlet 130 positioned downstream from the inlet 128, and a premix passage 132 extending from the inlet 128 to the outlet 130. Furthermore, each tube 126 also defines a fuel port 134 through which the fuel 28 in the corresponding fuel plenum 124 may flow into the corresponding premix passage 132.

The bundled tube fuel nozzle assembly 106 may also include a cap plate assembly 136 that provides thermal shielding from the combustion gases 30 (FIG. 1) in the combustion chamber 42. In this respect, the cap plate assembly 136 includes a cap plate 138 axially spaced apart from and positioned downstream from the aft plate 120. Each fuel nozzle tube 126 extends through the cap plate 138 to a position downstream therefrom. The cap plate assembly 136 also includes a cap barrel 140 that extends axially between the aft plate 120 and the cap plate 138. As such, the cap barrel 140 circumferentially surrounds a portion of each fuel nozzle tube 126 of the center fuel nozzle 112 and the outer fuel nozzle segments 114. The cap barrel 140 may couple to the inlet flow conditioner 104. The cap plate 138 and/or the cap barrel 140 may be single components or formed from multiple segments.

The end cover assembly 100 also includes one or more flame detector sight tubes 142 coupled to the end cover 102. In the embodiment shown in FIG. 3, the end cover assembly 100 includes two flame detector sight tubes 142. In alternate embodiments, however, the end cover assembly 100 may include one, three, or more flame detector sight tubes 142.

FIG. 4 illustrates one of the flame detector sight tubes 142 in greater detail. More specifically, the flame detector sight tube 142 includes a first end 144 and a second end 146 axially spaced apart from the first end 144. In the embodiment shown, the first end 144 is axially spaced apart and positioned upstream from the cold side surface 103 and the second end 146 is axially aligned with the hot side surface 101. In alternate embodiments, however, the first end 144 may be axially aligned with the cold side surface 103 and/or the second end 146 may be axially spaced apart from and positioned downstream of the hot side surface 101. Furthermore, the flame detector sight tube 142 defines a sight passage 148 extending from the first end 144 to the second end 146 and an axial centerline 150 extending through the center of the sight passage 148.

The end cover assembly 100 may also include one or more flame detectors 152 operable to detect the presence of a flame (i.e., combustion of the compressed air and fuel mixture) within the combustion chamber 42. More specifically, each flame detector 152 couples to the first end 144 of one of the flame detector sight tubes 142. In this respect, the flame detectors 152 are axially spaced apart and positioned upstream from the hot side surface 101 of the end cover 102 and the head end volume 48 to protect the flame detectors 152 from the heat of the combustion chamber 42. In particular embodiments, the flame detector sight tubes 142 also axially space the corresponding flame detectors 152 apart the cold side surface 103 of the end cover 102. In such embodiments, the flame detectors 152 are positioned upstream from the cold side surface 103 of the end cover 102 to further space the flame detectors 152 apart from the combustion chamber 42. The flame detectors 152 may be a charge-coupled device or any other suitable optical sensor.

Each flame detector sight tube 142 permits the corresponding flame detector 152 to detect the presence of a flame in the combustion chamber 42. In particular, the end cover 102 is positioned axially between the flame detectors 152 and the combustion chamber 42. The sight passages 148 of each flame detector sight tube 142 permit the flame detectors 152 to detect light associated with combustion in the combustion chamber 42 through the end cover 102.

As indicated above, the bundled tube fuel nozzle assembly 106 is positioned axially between the flame detector sight tubes 142 and the combustion chamber 42. In this respect and as illustrated in FIGS. 3 and 4, each flame detector sight tube 142 is aligned, such as radially and/or circumferentially aligned, with one of the fuel nozzle tubes 126 of the bundled tube fuel nozzle assembly 106. As such, the axial centerline 150 of each flame detector sight tube 142 may be collinear with an axial centerline 154 of one of the fuel nozzle tubes 126. The alignment of each the flame detector sight tube 142 with one the fuel nozzle tubes 126 provides optical communication between the corresponding flame detector 152 and the combustion chamber 42. That is, flame detectors 152 are able to detect light associated with combustion in the combustion chamber 42 through the bundled tube fuel nozzle assembly 106. Each flame detector sight tube 142 may be aligned with one the fuel nozzle tubes 126 of the center fuel nozzle 112 or one the fuel nozzle tubes 126 of one of the outer fuel nozzle segments 114.

Each flame detector 152 may be operatively coupled to a controller 156 of the gas turbine engine 10. In general, the controller 156 may comprise any suitable processor-based device known in the art, such as a computing device or any suitable combination of computing devices. In this respect, the controller 156 may include one or more processor(s) 158 and associated memory device(s) 160 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 160 of the controller 156 may generally comprise memory element(s) including computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory device(s) 160 may generally be configured to store suitable computer-readable instructions that the processor(s) 158 executes to perform various computer-implemented functions. In addition, the controller 156 may also include various other suitable components, such as a communications circuit or module, one or more input/output channels, a data/control bus, and/or the like.

As indicated above, the flame detectors 152 are communicatively coupled to the controller 156. In particular, the flame detectors 152 are communicatively coupled to the controller 156 via wired or wireless connections. In this respect, measurement signals (e.g., indicated by dashed line 162 in FIG. 4) may be transmitted from the flame detectors 152 to the controller 156. The controller 156 may then be configured to determine whether a flame is present in the combustion chamber 42 (FIG. 3) based on the measurement signals 162 received from the flame detectors 152. For example, the controller 156 may include a look-up table or suitable mathematical formula stored within the memory 160 that correlates the flame detector measurements to the presence of a flame in the combustion chamber 42.

As discussed in greater detail above, the flame detector sight tubes 142 couple to the end cover 102 of the end cover assembly 100. In this respect, the flame detector sight tubes 142 provide the flame detectors 152 with a better view of the combustion chamber 42 than conventional flame detector arrangements. Furthermore, each flame detector sight tube 142 is aligned with the one of the fuel nozzle tubes 126 of the bundled tube fuel nozzle assembly 106. As such and unlike with conventional flame detector arrangements, the flame detectors 152 are able to detect a flame within the combustion chamber 42 through the bundled tube fuel nozzle assembly 106.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An end cover assembly in a combustor of a gas turbine, the combustor defining an axial direction extending parallel to an axial centerline of the combustor, the end cover assembly comprising:
   an end cover including a hot side surface and a cold side surface;
   a bundled tube fuel nozzle assembly positioned downstream from the end cover, the bundled tube fuel nozzle assembly comprising a plurality of fuel nozzle tubes, the combustor defining a combustion chamber downstream of the bundled tube fuel nozzle assembly;
   a flame detector sight tube coupled to the end cover, the flame detector sight tube extending from a first end positioned upstream of the cold side surface to a second end positioned downstream from the cold side surface, the second end further being positioned upstream of and spaced apart along the axial direction from one of the fuel nozzle tubes, the flame detector sight tube defining an axial centerline, wherein the axial centerline of the flame detector sight tube is collinear with an axial centerline of the one of the fuel nozzle tubes; and
   a flame detector operable to detect a flame in the combustion chamber, the flame detector coupled to the flame detector sight tube such that the flame detector has an unobstructed view of the combustion chamber through the one of the fuel nozzle tubes.

2. The end cover assembly of claim 1, wherein the bundled tube fuel nozzle assembly includes a center fuel nozzle corresponding to a first portion of the plurality of fuel nozzle tubes and one or more outer fuel nozzle segments positioned annularly around the center fuel nozzle corresponding to a second portion of the plurality of fuel nozzle tubes, and wherein the flame detector sight tube is aligned with one of the fuel nozzle tubes of the first portion of the plurality of fuel nozzle tubes.

3. The end cover assembly of claim 1, wherein the bundled tube fuel nozzle assembly includes a center fuel nozzle corresponding to a first portion of the plurality of fuel nozzle tubes and one or more outer fuel nozzle segments positioned annularly around the center fuel nozzle corresponding to a second portion of the plurality of fuel nozzle tubes, and wherein the flame detector sight tube is aligned with one of the fuel nozzle tubes of the second portion of the plurality of fuel nozzle tubes.

4. The end cover assembly of claim 1, wherein the flame detector sight tube spaces the flame detector apart from the end cover.

5. The end cover assembly of claim 1, wherein the flame detector is a charge coupled device.

6. The end cover assembly of claim 1, wherein the second end of the flame detector sight tube is aligned along the axial direction with the hot side surface of the end cover.

7. The end cover assembly of claim 1, further comprising:
   a first plurality of flame detector sight tubes coupled to the end cover, wherein each of the first plurality of flame detector sight tube is aligned with one of the fuel nozzle tubes.

8. A turbomachine, comprising:
   a compressor section; a turbine section; and
   one or more combustors, each combustor defining an axial direction extending parallel to an axial centerline of the corresponding combustor, each combustor including an end cover assembly, comprising:
   an end cover including a hot side surface and a cold side surface;
   a bundled tube fuel nozzle assembly positioned downstream from the end cover, the bundled tube fuel nozzle assembly comprising a plurality of fuel nozzle tubes, the combustor defining a combustion chamber downstream of the bundled tube fuel nozzle assembly;
   a flame detector sight tube coupled to the end cover, the flame detector sight tube extending from a first end positioned upstream of the cold side surface to a second end positioned downstream from the cold side surface, the second end further being positioned upstream of and spaced apart along the axial direction from one of the fuel nozzle tubes, the flame detector sight tube defining an axial centerline, wherein the axial centerline of the flame detector sight tube is collinear with an axial centerline of the one of the fuel nozzle tubes; and
   a flame detector operable to detect a flame in the combustion chamber, the flame detector coupled to the flame detector sight tube such that the flame detector has an unobstructed view of the combustion chamber through the one of the fuel nozzle tubes.

9. The turbomachine of claim 8, wherein the bundled tube fuel nozzle assembly includes a center fuel nozzle corresponding to a first portion of the plurality of fuel nozzle tubes and one or more outer fuel nozzle segments positioned annularly around the center fuel nozzle corresponding to a first portion of the plurality of fuel nozzle tubes, and wherein the flame detector sight tube is aligned with one of the fuel nozzle tubes of the first portion of the plurality of fuel nozzle tubes.

10. The turbomachine of claim 8, wherein the bundled tube fuel nozzle assembly includes a center fuel nozzle corresponding to a first portion of the plurality of fuel nozzle tubes and one or more outer fuel nozzle segments positioned annularly around the center fuel nozzle corresponding to a second portion of the plurality of fuel nozzle tubes, and wherein the flame detector sight tube is aligned with one of the fuel nozzle tubes of the second portion of the plurality of fuel nozzle tubes.

11. The turbomachine of claim 8, wherein the flame detector sight tube spaces the flame detector apart from the end cover.

12. The turbomachine of claim 8, wherein the flame detector is a charge coupled device.

13. The turbomachine of claim 8, wherein the second end of the flame detector sight tube is aligned along the axial direction with the hot side surface of the end cover.

14. The end cover assembly of claim 8, further comprising:
   a first plurality of flame detector sight tubes coupled to the end cover, wherein each of the first plurality of flame detector sight tube is aligned with one of the fuel nozzle tubes.

15. The end cover assembly of claim 1, wherein the flame detector sight tube defines a sight passage extending from the first end of the flame detector sight tube to the second end of the flame detector sight tube.

16. The turbomachine of claim 8, wherein the flame detector sight tube defines a sight passage extending from the first end of the flame detector sight tube to the second end of the flame detector sight tube.

* * * * *